Patented July 29, 1930

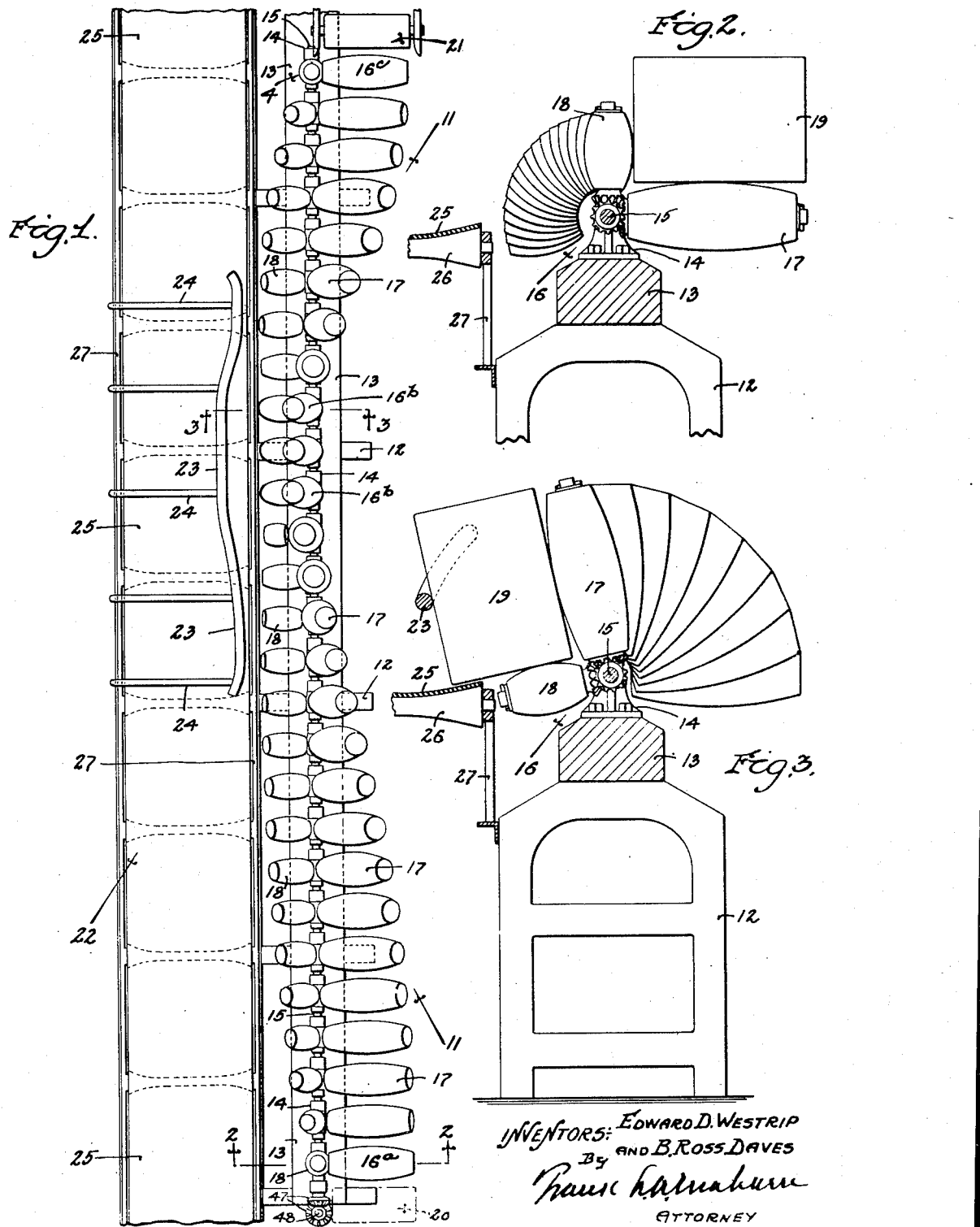

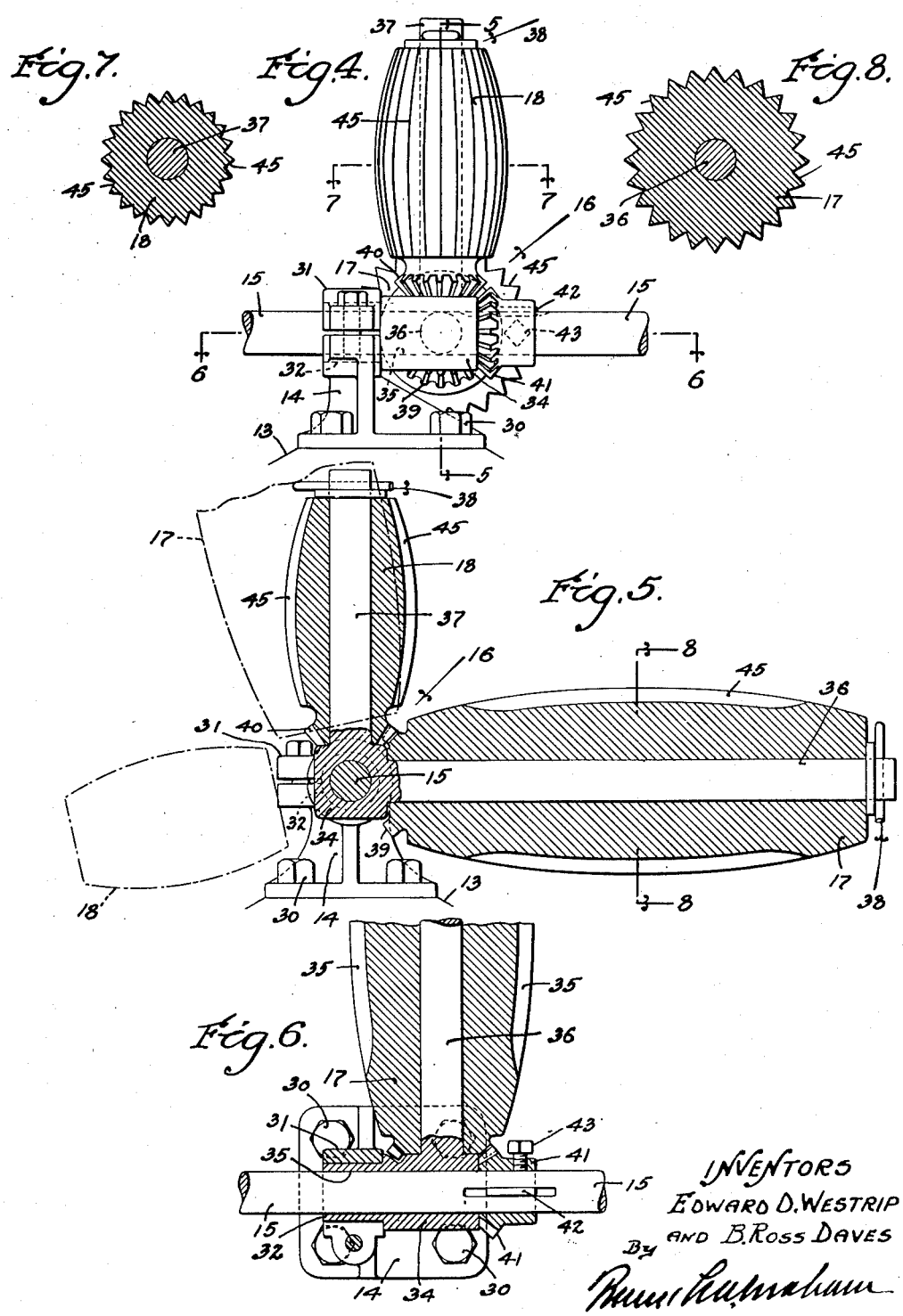

1,771,473

UNITED STATES PATENT OFFICE

EDWARD D. WESTRIP, OF POMONA, AND BRUNER ROSS DAVES, OF CLAREMONT, CALIFORNIA

BOX-DUMPING MACHINE

Application filed December 19, 1928. Serial No. 327,160.

This invention is adapted particularly for use in the fruit and vegetable packing and canning industries where such material is handled in crates or boxes from which it must be rapidly removed without injury for the purpose of washing, sorting, cleaning, etc. It will be understood however that the invention is not necessarily confined to any one particular industry but that it may be used any place where material is handled in boxes or crates or where it is desirable to impart a partial rotation to objects during an uninterrupted advance over a conveyor.

In the fruit packing industry, and particularly in large packing houses or canneries, the fruit is transported from place to place within the packing house by means of conveyors.

The boxes or crates in which the material is delivered to the packing house are first delivered, by means of a belt or roller conveyor, to a dumping station where they are dumped onto a belt conveyor by means of which they are carried through the various succeeding steps, depending upon the nature of the industry. The dumping of the boxes is ordinarily effected manually by one or more operators or may be effected by means of a suitable dumping machine.

The manual performance of this operation in a large industry is necessarily slow and cumbersome, and the box dumping machines which are now in use have proved unsatisfactory for various reasons.

The ordinary dumping machines such as are now in use in the industry might be described as embodying a pair of arms which are mounted in a lever system in a manner such that they are effective to lift and tilt a box permitting the contents to roll out upon a conveyor belt. The conveyor carrying the boxes must be stopped while each box is dumped and such a machine is therefore limited in its speed. In the event an attempt is made to operate the machine rapidly the boxes are not thoroughly cleaned and the machine must at all times be attended by an operator to inspect each box after it is dumped.

It will be seen, therefore, that a machine of this character which is intermittent in its operation is consequently slow and inefficient. It is not thorough in cleaning the boxes, requires the constant attention of an operator and is attended by a further undesirable feature in that the fruit is thrown from the boxes by the machine and has a tendency to be bruised. For this reason these machines cannot be used in connection with soft fruit.

It is therefore a primary object of this invention to produce a box dumping machine which is continuous in its operation and may be operated efficiently at any desired speed, the boxes being continuously dumped while they travel over the conveyor.

It is a further object of this invention to produce a box dumping machine in which the empty boxes are continuously delivered to a conveyor from the dumping machine.

A still further object of the invention is to produce a machine which is thorough in its operation and is so designed that the fruit rolls gently from the box on to a suitable conveyor belt, thus eliminating the possibility of bruising soft fruit.

The general construction of this invention embodies a plurality of sets of rolls, each set comprising two rolls angularly disposed with relation to each other and connected in a manner such that they are both driven at the same peripheral speed. The axes of all of these rolls are adapted to intersect in a common transverse line, and means are provided for synchronously rotating all of the rolls in the same direction at the same time. It will thus be seen that this system of rolls embodies a conveyor unit which will impart uniform advance to any object which is placed at the forward end of the conveyor.

In order that the box or other object received by this conveyor may be tilted from a horizontal to an angular position, the first of these roller members are positioned in a substantially horizontal plane and each successive roller is positioned at a slightly greater angle relative to a horizontal plane than each preceding roll. It will thus be seen that this system provides a conveyor which may be considered as having been twisted in a manner such that objects received by the conveyor are tilted from a horizontal to an angular position and are returned again to a horizontal position during their movement over the conveyor.

Further objects of the invention are to produce a box dumping machine of the class described in which the roller members embodied in this machine are barrel shaped, are provided with corrugations and may be angularly adjusted to give the desired lift or tilt to a box passing over the conveyor, and in which the conveyor may be extended or shortened and the abruptness of the "lift" thereby decreased or increased by the addition or removal of roller units.

A still further object of the invention is to produce a machine of the class described in which means are provided for synchronously advancing all of the rolls in the same direction at the same peripheral speed.

Details in the construction of this invention, and further objects attending its production, will be better understood from the following description of the accompanying drawings, in which Fig. 1 is a plan view of a conveyor assembly embodying our invention.

Fig. 2 is a sectional elevation taken substantially in the plane represented by the line 2—2 in Fig. 1.

Fig. 3 is a sectional elevation taken substantially in a plane represented by the line 3—3 in Fig. 1.

Fig. 4 is an elevational view illustrating the construction of an individual roller unit such as is used in the combination shown in Fig. 1, and may be considered as having been taken substantially in the direction of the arrow 4 in Fig. 1.

Fig. 5 is an elevational section taken substantially in the plane represented by the line 5—5 in Fig. 4.

Fig. 6 is a partial plan section taken substantially in a plane represented by the line 6—6 in Fig. 4.

Fig. 7 is a sectional view showing the construction of a preferred form of roll used in this invention and may be considered as having been taken substantially in a plane represented by line 7—7 in Fig. 4.

Fig. 8 is a sectional view similar to that shown in Fig. 7 but is taken substantially in a plane represented by the line 8—8 in Fig. 5.

More particularly describing the invention as herein illustrated, reference numeral 11 indicates a so-called twisted conveyor unit which embodies supporting standards 12, a longitudinal support 13, bearing members 14, a drive shaft 15 and roller units 16 which are supported by the bearing members 14 and are adapted to be driven by the drive shaft 15, as will be hereinafter described.

The roller units 16 embody angularly disposed barrel-shaped rollers 17 and 18 which are adapted to support boxes as indicated at 19. The boxes are delivered to the dumping conveyor unit 11 by means of any suitable conveyor such as is indicated at 20, and the empty boxes are received by suitable receiving conveyor such as indicated at 21.

It will be noted from Figs. 1 to 3, inclusive, that the first roller unit indicated at 16ª is adapted to receive and hold a box in a substantially horizontal position and that each succeeding unit is angularly adjusted so that the box is gradually lifted or tilted from a substantially horizontal position, shown in Fig. 2, to an angularly disposed position shown in Fig. 3, the rollers in this position being substantially as indicated at 16ᵇ in Fig. 1.

This gradual tipping action is effective to permit the contents of the box to roll gently upon a suitable conveyor belt or receiving member such as is indicated by reference numeral 22.

After the boxes have been carried to the extreme tilted position indicated by the roller 16ᵇ they are again returned to a horizontal position by gradually decreasing the angularity of the rolls until the roller 16ᶜ is reached which is in substantially the same position as the roller 16ª.

In view of the fact that the box being returned to the horizontal position is empty, a smaller number of rollers may be used to return the empty box to a horizontal position than was used in lifting the box from a horizontal to an angular position. This relation is perhaps best illustrated in the plan view shown in Fig. 1.

For the purpose of preventing the box 19 from falling upon the receiving belt 22 when it has been tilted beyond a substantially vertical position, a guide bar or brace, indicated by reference numeral 23, is provided near the central section of the dumping conveyor and is held in a substantially rigid position by any suitable means such as the bracing members indicated at 24.

It was suggested above that the fruit being dumped from the box might be received in any desired manner upon a suitable conveyor belt or receiving member. A preferred means for such reception is however indicated in Figs. 2 and 3 as comprising a V-shaped or curved conveyor belt 25 which is supported by means of suitable "dished" rollers 26, the rollers in turn being carried by any preferred form of braces or brackets such as indicated at 27.

The details in the construction of the roller units 16 are perhaps best illustrated in Figs. 4 to 8 where it will be noted that the bearing member 14 is mounted upon the longitudinal support 13 by means such as the screws 30. The upper end of this bearing member is provided with a clamping sleeve 31 which is adapted to receive a hub 32 formed on the extended end of a roll supporting member 34. The roll supporting member 34 is provided with a passage 35 which is coaxial with the clamping sleeve 31 and is adapted to receive the drive shaft 15. In the embodiment of the invention illustrated in Figs. 4 to 8, inclusive, the roll supporting member 34 is provided with two angularly extending bearing stems 36 and 37, such stems being adapted to rotatably support the rollers 17 and 18, respectively. The rollers 17 and 18 are retained upon their respective stems in any preferred manner as indicated at 38.

The inner ends of the roller members 17 and 18 are provided with inter-meshing bevel gears 39 and 40 and these gears are so proportioned relative to the diameters of the respective rollers as to rotate both of the rollers in the same direction at the same peripheral speed.

For the purpose of imparting rotation to the rollers from the drive shaft 15, a third bevel gear 41 is rigidly mounted upon the drive shaft in a position so that it engages the bevel gear 39 upon the roller member 17. The gear 41 is retained upon the drive shaft in any suitable manner such as by means of the key 42 and the set screw 43, and it will be apparent from Figs. 4 and 6 that the rotation of the drive shaft 15 is adapted to effect a corresponding rotation of the roller member 17 which in turn rotates the roller member 18.

Each of the roller units throughout the entire organization is the same as the unit illustrated in Figs. 4 to 8, inclusive, all of the units being provided with bevel gears inter-connecting the rolls with the drive shaft, and from this construction it will be apparent that all of the rolls are synchronously rotated in the same direction at the same peripheral speed. The clamping sleeve and the hub 32 provide means whereby each set of rollers may be angularly adjusted to any desired position from one extreme, such as indicated in full lines in Fig. 5, to the extreme tilted position such as indicated in dot and dash lines in the same figure.

It will also be understood that this construction facilitates the adjustment of the conveyor system for increasing or decreasing the abruptness with which the box is raised and lowered from and to a horizontal position. The drive shaft 15 may be of any desired length and roller units may be added thereto or taken therefrom and the angularity of the units be co-operatively adjusted to accommodate any condition such as the weight of the boxes and the quality of the fruit or material which is being handled.

In order that the boxes may receive a uniform and positive advance over the conveyor it is considered preferable to provide the roller members with corrugations such as are indicated at 45, such corrugations being best illustrated in the sectional views shown in Figs. 7 and 8.

It will of course be understood that the drive shaft 15 may be driven in any desired manner, the preferred means being indicated in Fig. 1 as comprising oppositely disposed bevel gears 47 and a main drive shaft 48.

The operation of this invention will be readily understood from the foregoing description and it will be apparent that this invention embodies a box dumping conveyor which is efficient, thorough and continuous in its operation, and which may be readily adjusted to meet the conditions under which it is operating; and, while we have here... described and illustrated one preferred embodiment of the invention, it is not limited to the precise construction set forth but includes within its scope whatever changes fairly come within the spirit of the appended claims.

We claim as our invention:

1. A box dumping machine embodying a twisted conveyor comprising a plurality of rolls adapted to advance a box and at the same time tilt said box from a horizontal to an angular position.

2. A box dumping machine embodying a twisted conveyor comprising a plurality of rolls adapted to advance a box and at the same time tilt said box from a horizontal to an angular position; and means for synchronously rotating said rolls.

3. A box dumping machine embodying a twisted conveyor comprising a plurality of rolls adapted to advance a box and at the same time tilt said box from a horizontal to an angular position; and power means including a transverse extending shaft having drive members thereon adapted to engage corresponding drive members on said rolls for synchronously rotating said rolls.

4. A box dumping machine embodying a twisted conveyor comprising a plurality of rolls adapted to advance a box and at the same time tilt said box from a horizontal to an angular position, said rolls being barrel shaped.

5. A box dumping machine embodying a twisted conveyor comprising a plurality of rolls adapted to advance a box and at the same time tilt said box from a horizontal to an angular position, said rolls being barrel shaped and having corrugated outer surfaces.

6. A box dumping machine embodying a twisted conveyor adapted to advance a box and at the same time tilt said box from a horizontal to an angular position, said conveyor comprising a plurality of sets of rolls, each set including two rolls angularly disposed with each other.

7. A box dumping machine embodying a twisted conveyor adapted to advance a box and at the same time tilt said box from a horizontal to an angular position, said conveyor comprising a plurality of sets of rolls, each set including two rolls angularly disposed with each other; and means for imparting synchronous rotation to each set of rolls.

8. A box dumping machine embodying a twisted conveyor adapted to advance a box and at the same time tilt said box from a horizontal to an angular position, said conveyor comprising a plurality of sets of rolls, each set including two rolls angularly disposed with each other; and means for imparting synchronous rotation to all of said rolls.

9. A box dumping machine embodying a twisted conveyor adapted to advance a box and at the same time tilt said box from a horizontal to an angular position, said conveyor comprising a plurality of sets of rolls, each set including two rolls angularly disposed with each other; and means for rotating the rolls in each set at the same peripheral speed.

10. A box dumping machine embodying a twisted conveyor comprising a plurality of rolls adapted to advance a box and at the same time tilt said box from a horizontal to an angular position, and means for imparting angular adjustment to said rolls about a common transverse axis.

11. A box dumping machine embodying a twisted conveyor adapted to tilt a box from a horizontal to an angular position, said conveyor comprising a longitudinally extending drive shaft, a plurality of transverse rolls supported in fixed relation to said drive shaft, and means for imparting angular adjustment to said rolls relative to said drive shaft.

12. A box dumping machine embodying a twisted conveyor adapted to tilt a box from a horizontal to an angular position, said conveyor comprising a longitudinally extending drive shaft, a plurality of transverse rolls supported in fixed relation to said drive shaft, and means for transmitting rotation to said rolls from said drive shaft.

13. A conveyor member adapted to move an object from a horizontal to an angular position during the longitudinal advance of said object over said conveyor embodying: a plurality of rolls, the first of said rolls being in a substantially horizontal plane, and each successive roll being disposed at an increased angle relative to a horizontal plane.

14. A conveyor member adapted to move an object from a horizontal to an angular position during the longitudinal advance of said object over said conveyor embodying: a plurality of rolls, the first of said rolls being in a substantially horizontal plane, and each successive roll being disposed at an increased angle relative to a horizontal plane, and means for synchronously rotating all of said rolls.

15. A conveyor member adapted to move an object from a horizontal to an angular position during the longitudinal advance of said object over said conveyor, embodying: a supporting member; a plurality of bearings on said supporting member; hub members adjustably mounted in said bearings; a drive shaft extending through said hub members, and transverse rolls rotatably mounted on said hub members and adapted to receive rotation from said drive shaft.

16. A conveyor member adapted to move an object from a horizontal to an angular position during the longitudinal advance of said object over said conveyor, embodying: a supporting member; a plurality of bearings on said supporting member; hub members adjustably mounted in said bearings; a drive shaft extending through said hub members, transverse rolls rotatably mounted on said hub member; intermeshing gears on the inner ends of said rolls, and gears on said drive shaft adapted to drive said rolls.

17. A roll unit for use in combination with a conveyor of the class described comprising: a bearing member having a sleeve clamp formed on the upper end thereof; a roll supporting member having a passage therethrough adapted to receive a drive shaft, and a hub member formed on said roll supporting member coaxial with said passage adapted to be received by said clamping sleeve; roller members rotatably mounted on said supporting member substantially at right angles with each other; and a gear fixed to the inner end of each roller member, said gears being in mesh with each other.

18. A roll unit for use in combination with a conveyor of the class described comprising: a bearing member having a sleeve clamp formed on the upper end thereof; a roll supporting member having a passage therethrough adapted to receive a drive shaft, and a hub member formed on said roll supporting member coaxial with said passage adapted to be received by said clamping sleeve; roller members rotatably mounted on said roll supporting member substantially at right angles with each other; and a gear fixed to the inner end of each roller member, said gears being in mesh with each other, and the diameter of said gears being so proportioned relative to the diameters of said rollers as to rotate said rollers at the same peripheral speed.

19. A roll unit for use in combination with a conveyor of the class described comprising: a bearing member having a sleeve clamp formed on the upper end thereof; a roll supporting member having a passage therethrough adapted to receive a drive shaft, and a hub member formed on said roll supporting member coaxial with said passage adapted to be received by said clamping sleeve; roller members rotatably mounted on said roll supporting member substantially at right angles with each other; a gear fixed to the inner end of each roller member, said gears being in mesh with each other; a drive shaft extending through said hub member and a gear on said drive shaft in engagement with one of said roller carried gears.

20. A box dumping unit embodying a twisted conveyor adapted to linearly advance a box and at the same time tilt said box from a horizontal to an angular position, and means for receiving the contents of said box comprising a conveyor belt parallel with said twisted conveyor, said conveyor belt being centrally depressed.

21. An object tilting machine embodying a twisted conveyor comprising: means for advancing an object longitudinally thereover, said conveyor being arranged so as to tilt the object from a horizontal to an angular position during the movement of said object over the advancing means.

In testimony whereof, we have hereunto set our hands at Los Angeles, California, this 25th day of October, 1928.

EDWARD D. WESTRIP.
B. ROSS DAVES.